United States Patent [19]

Medrano

[11] Patent Number: 4,612,778

[45] Date of Patent: Sep. 23, 1986

[54] PRECOOLER FOR AN EVAPORATIVE COOLER

[76] Inventor: Michael V. Medrano, P.O. Box 131, Cashion, Ariz. 85329

[21] Appl. No.: 701,734

[22] Filed: Feb. 14, 1985

[51] Int. Cl.[4] .............................................. F28D 5/00
[52] U.S. Cl. ...................................... 62/311; 62/304; 62/310; 261/147; 261/151
[58] Field of Search ................ 62/304, 309, 310, 311; 261/29, 97, 106, DIG. 3, DIG. 41, 147, 151, 152

[56] References Cited

U.S. PATENT DOCUMENTS

| | | | |
|---|---|---|---|
| 2,091,198 | 8/1937 | Fabry | 261/35 |
| 2,566,366 | 9/1951 | Pennington | 62/310 |
| 3,116,612 | 1/1964 | Pennington | 62/11 |
| 3,147,319 | 9/1964 | Goettl | 261/29 |
| 3,290,866 | 12/1966 | Schonrock | 55/229 |
| 3,984,995 | 10/1976 | Starr | 62/305 |
| 4,045,523 | 8/1977 | Goettl | 261/97 |
| 4,101,609 | 7/1978 | Sumrow | 261/105 |
| 4,309,365 | 1/1982 | Van Ness et al. | 62/310 |
| 4,353,219 | 10/1982 | Patrick, Jr. | 62/183 |

*Primary Examiner*—Henry Bennett
*Attorney, Agent, or Firm*—Warren F. B. Lindsley

[57] ABSTRACT

An auxiliary cooler shell for installation over and around a conventional evaporative cooler for the enhancement of the cooling effectiveness and efficiency of the existing cooling system, the auxiliary shell incorporating evaporator pads and a water distribution spider that is supplied by the water pump of the conventional cooler over which the shell is installed.

8 Claims, 6 Drawing Figures

4,612,778

PRECOOLER FOR AN EVAPORATIVE COOLER

BACKGROUND OF THE INVENTION

With the advent of higher energy costs, the evaporative cooler as an air conditioning system is again assuming prominence in the marketplace. Its installation and operating costs are more economical than a refrigeration unit and even where a refrigeration system is needed, the trend is now to utilize both types working together to provide an air conditioning system.

While the cost of operating an evaporative cooling system is considerably less expensive than that of a mechanical refrigeration system incorporating compressors and condensers, further improvements in the effectiveness and efficiency of the evaporative cooler are economically desirable. The present invention provides a means for enhancing the cooling efficiency of an existing evaporative cooler, the means comprising a set of auxiliary evaporator pads mounted in a shell that may be fitted over and around the existing cooler In this arrangement, the air to be cooled first passes through the auxiliary pads for precooling before entering the main evaporative cooler.

DESCRIPTION OF THE PRIOR ART

Numerous improvements in evaporative coolers have been conceived; however, more are needed for it to function effectively under all operating conditions and competitively with refrigeration systems.

U.S. Pat. No. 2,091,198 describes an evaporative cooling system employing main and auxiliary cooling units. The auxiliary unit is positioned adjacent and upstream from the main unit with a common fan or blower placed therebetween.

The present invention offers important improvements in form over this patented structure and results in a more practical and commercially acceptable product.

U.S. Pat. No. 4,353,219 describes an evaporative precooler in the form of a jacket to be installed around three sides of a condensing unit of a mechanical refrigeration system. The present invention, however, is tailored for use with an existing evaporative cooler rather than with a refrigeration system, and it is therefore able to provide economies related to the common usage of water pumps, reservoirs and other water distribution and supply components that are not present in refrigeration systems.

Numerous other improvements and variations in the evaporative cooling art are described in U.S. Pat. Nos. 3,147,319; 4,045,523; 4,101,609; 3,984,995 and 3,290,866. The arrangements described in these patents, however, are not believed to anticipate the novelty of the present invention.

SUMMARY OF THE INVENTION

In accordance with the invention claimed, an auxiliary evaporative cooler shell is provided for use in the enhancement of the operation of an existing evaporative cooling system. The auxiliary cooler shell comprises a framework carrying evaporator pads on as many as four sides with provision for water distribution to the pads. The shell is intended to be placed over and around the existing cooler and it shares with the existing cooler the water pump and supply means as well as the air moving system.

It is, therefore, an object of the present invention to provide an improved evaporative cooling system.

Another object of the invention is to provide an auxiliary evaporative cooler shell that may be placed over an existing evaporative cooler to improve the operating effectiveness and efficiency of the cooling system.

A further object of the invention is to provide such an auxiliary evaporative cooler shell in a form that provides for maximum common useage of water and air handling components already present in the existing evaporative cooling unit.

A still further object of the invention is to provide such a cooler shell which, by virtue of such common useage, is inexpensive in terms of its initial manufacturing cost.

A still further object of the invention is to provide such a cooler shell in a form which facilitates its installation over an existing cooler and which requires a minimum of additional mounting space.

A still further object of the present invention is to provide such a cooler shell as a means for upgrading an existing evaporative cooler that has been found incapable of handling its required cooling load.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described with reference to the accompanying drawings, in which.

DESCRIPTION OF THE PREFERRED EMBODIMENT

Figure 1:
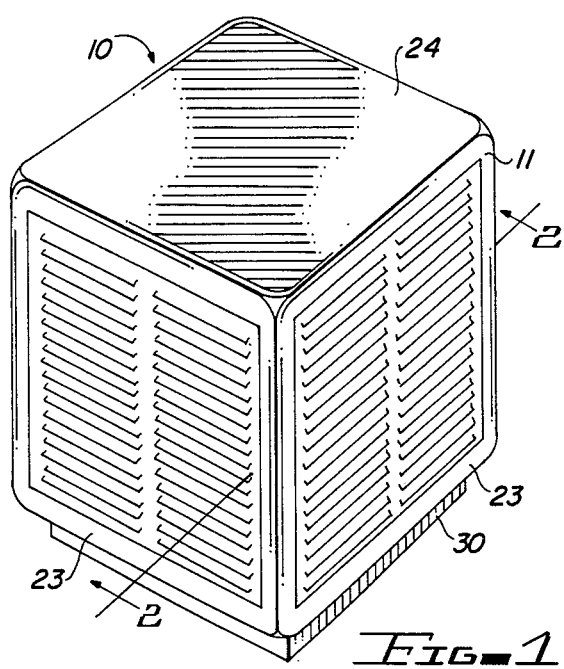
FIG. 1 is a perspective view showing the exterior of a conventional evaporative cooler.
Figure 2:
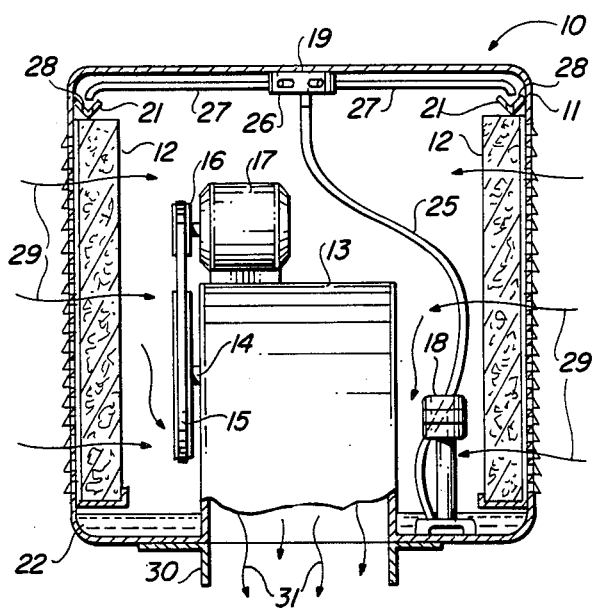
FIG. 2 is a cross-sectional view of the evaporative cooler of FIG. 1 as seen along line 2—2.

Referring more particularly to the drawings by characters of reference, FIGS. 1 and 2 illustrate a conventional evaporative cooler 10 comprising a housing 11, evaporator pads or assemblies 12 formed of a porous media, a fan or blower 13, its shaft 14 coupled by means of a pulley 15 and a belt 16 to an electric motor 17, a water pump 18, a water distribution system including a "spider" 19 and troughs 21, and a water reservoir or sump 22.

Housing 11 has four vertical walls 23 of approximately equal dimensions, a flat horizontal top 24 and an air delivery port 30 at the bottom of unit 10. The four walls 23 are louvered as shown for the passage of air.

Pump 18 supplies water from sump 22 through a rubber or plastic hose 25 to a central manifold 26 of spider 19. From manifold 26, the water flows through legs 27 of spider 19 into distribution troughs 28 located along the top edges of pads 12. From troughs 28, the water drips through distributor openings or holes uniformly positioned or disposed along the bottoms of troughs 28 onto pads 12. The water dropping on the tops of pads 12 seeps downwardly through pads 12 keeping them moist. Pads 12 are typically made of excelsior or of a synthetic water absorbent material capable of holding moisture. Excess water drains from the bottom of pads 12 to sump 22. The water level in sump 22 is maintained by a water supply line and a float controlled valve, not shown in the drawings.

Blower 13, typically a centrifugal or squirrel cage type, draws outside or ambient air 29 through the air inlet side of pads 12 and delivers air through its outlet side through port 30 to the dwelling or other structure to be cooled. As the air passes through pads 12, it gives up heat to the evaporating water held by the pads so that air 31 delivered at port 30 is considerably cooler than outside air 29.

In a given installation, the performance of the evaporative cooler and the demands placed upon it vary with the season. During periods of high temperature and low humidity, the cooling demand is high, but the cooling efficiency is also high because of the low humidity which aids evaporation. When both temperature and humidity are high, the demand is high and the efficiency is low. At such times, it is frequently found that the evaporative cooler as installed is not adequate to meet the demand. The auxiliary cooler shell or precooler of the present invention provides a means for enhancing the performance of the evaporative cooler so that more effective cooling can be obtained throughout the cooling season.

Figure 3:
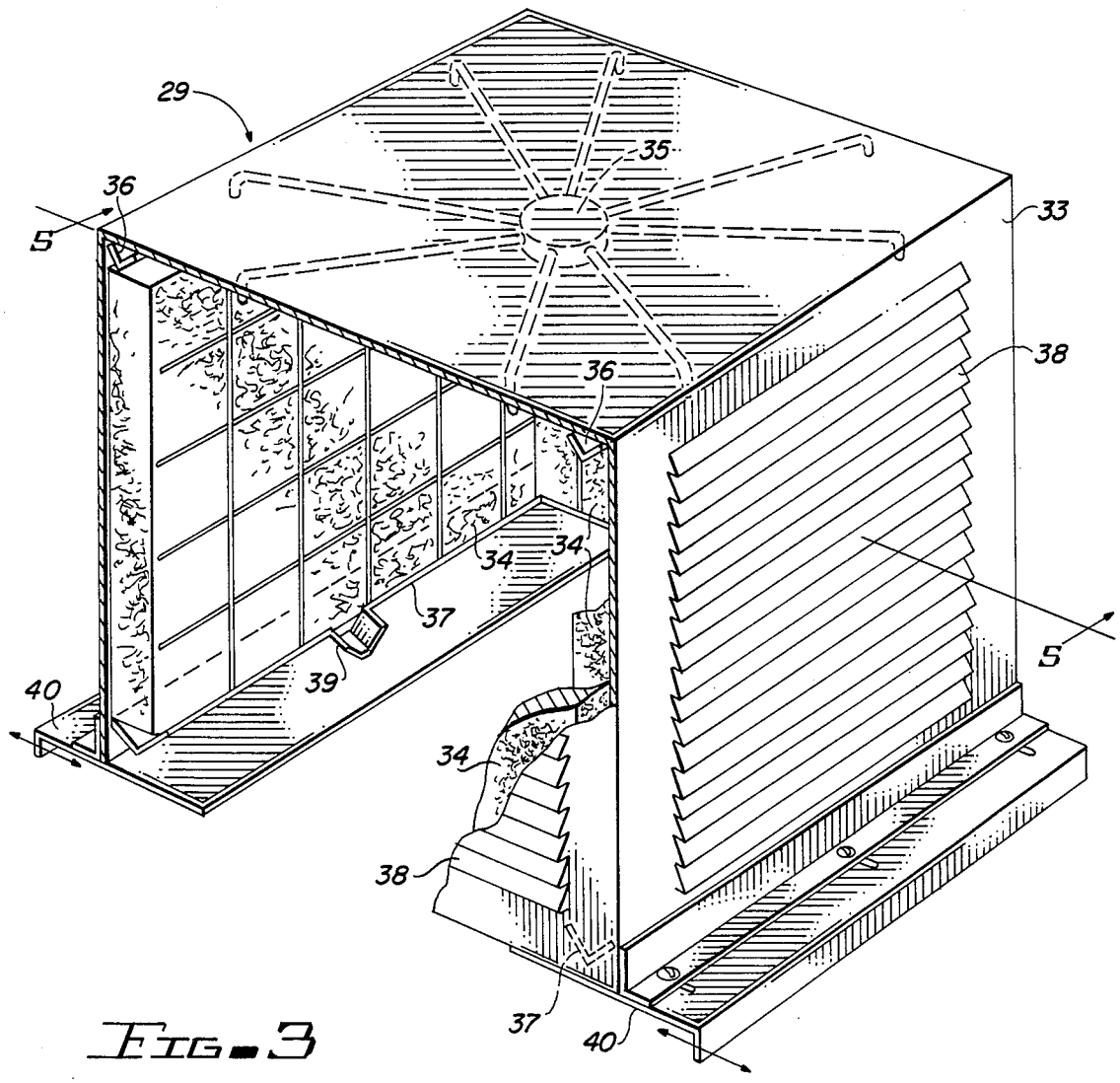
FIG. 3 is a perspective view of the auxiliary evaporative cooler shell of the invention with the front panel removed to reveal details of the interior construction.

The auxiliary cooler shell 32, as shown in FIG. 3, comprises a shell, jacket or frame 33, a porous media, such as evaporator pads 34, a spider 35, water distribution troughs 36 and drain troughs 37.

The arrangement of the components of shell 32 is similar to the arrangement of the corresponding parts in the conventional cooler 10, as described above. In a downdraft version of the shell, there are four pads 34, one inside each of the four louvered walls 38 of frame 33. Spider 35 receives water from pump 18 located in the primary evaporative cooler 10 and delivers it to the distribution troughs 36. Water from troughs 36 passes through uniformly distributed holes in the base of troughs 36 and seeps downwardly by gravitation through evaporator pads 34. The excess water is collected at the bottoms of pads 34 by collection trough 37, flowing from trough 37 through an overflow spout 39 back into sump 22 of evaporative cooler 10.

Sliding plates or baffles 40 are provided at the bottom of frame 33 about its periphery for use in sealing against air leakage when shell 32 is installed over an evaporative cooler, thereby restricting the inflow of ambient air to said media before reaching the air inlets of the pad assemblies of the associated evaporative cooler. Plates 40 are slidably mounted to permit movement in the direction of the arrows 41 as shown in FIG. 3.

Figure 5:
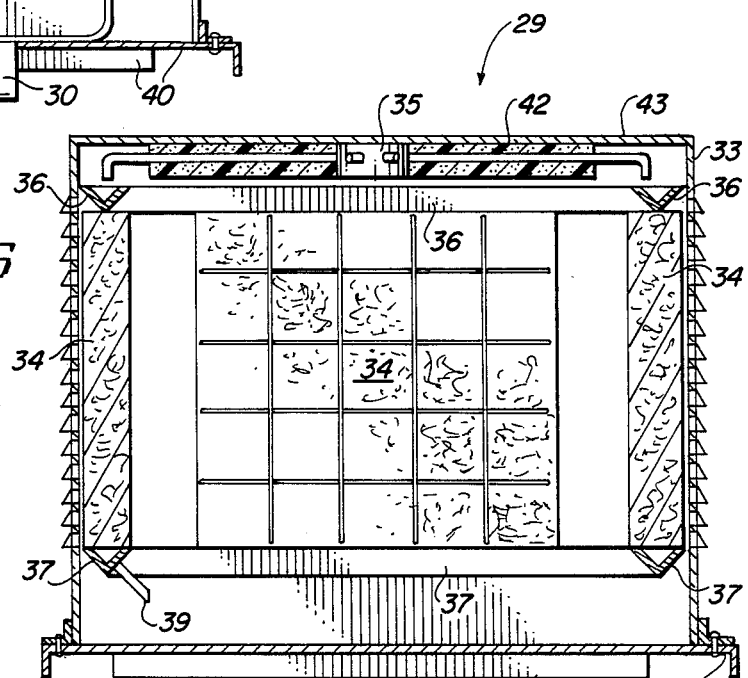
FIG. 5 is a cross-sectional view of the cooler shell of FIG. 3 as seen along line 5—5.

As shown in FIG. 5, spider 35 is surrounded by a thermally insulating urethane foam pad 42 which aids in securing spider 35 to the underside of top member 43 of frame 33 and reduces heat flow into the top of shell 32 on hot sunny days.

Figure 4:
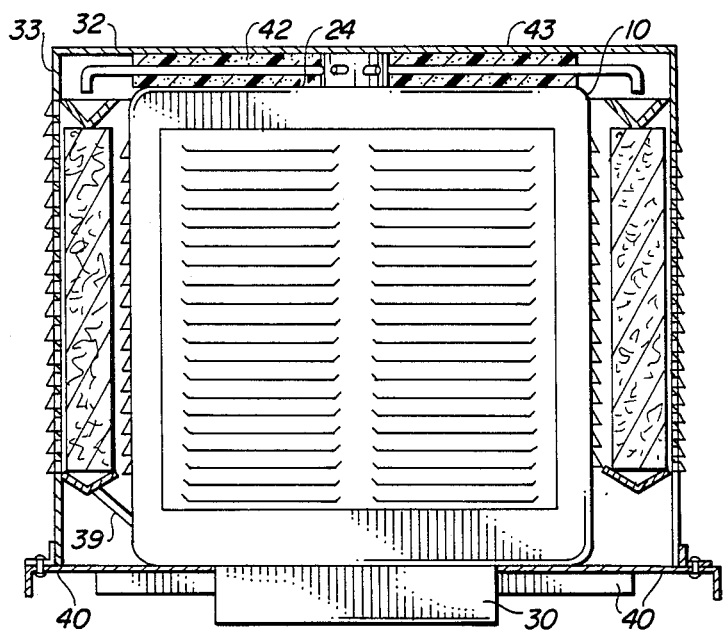
FIG. 4 shows the cooler shell of FIG. 3 installed over the conventional cooler of FIGS. 1 and 2 with the shell illustrated in cross-section.
Figure 6:
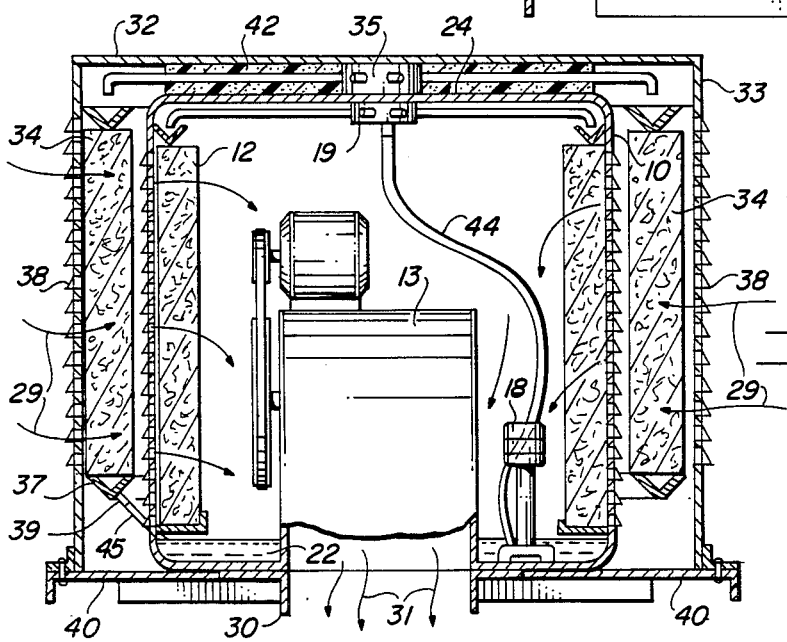
FIG. 6 is a cross-sectional view of the cooler shell mounted over and around the main or existing evaporative cooler in functional relationship therewith.

When shell 32 is installed over a conventional cooler 10, as shown in FIGS. 4 and 6, the four walls 38 of frame 33 surround the corresponding four walls of cooler 10 and the underside of urethane pad 42 rests upon top 24 of cooler 10. The plates 40 at the base of shell 32 are moved inwardly against the sides of port 30 or against the sides of the frame of cooler 10 to seal off the space between shell 32 and cooler 10 so that air flow from outside shell 32 can pass only through louvered walls 38 of frame 33.

As shown in FIG. 6, spider 19 of cooler 10 and spider 35 of shell 32 are in direct communication with each other for water flow and both are supplied by pump 18 of cooler 10. In an actual installation, this connection is not made as shown in FIG. 6. For convenience a rubber or plastic tube is connected between spider 35 and tube 44 of FIG. 6 that carries water from pump 18 to spider 19. A commercially available "Y" or "T" fitting is employed for this purpose.

Also, as shown in FIG. 6, spout 39 fed by trough 37 drains through a rubber tube 45 or other means into sump 22 of cooler 10.

The operation of the enhanced evaporative cooling system comprising shell 32 installed over cooler 10 occurs as follows:

Water from pump 18 of cooler 10 flows to spiders 19 and 35 of cooler 10 and shell 32, respectively. Spider 19 supplies water to pads 12 of cooler 10 and spider 35 supplies water to pads 34 of shell 32. Excess water from pads 12 and 34 is returned to pump 18 by way of sump 22. Blower 13 of cooler 10 draws air 29 from outside shell 32, the air 29 passing first through pads 34, and then through pads 12 of shell 32 and cooler 10, respectively. The air is cooled by evaporation of water at pads 34 and 12 and then passes through blower 13 and port 30 into the dwelling that is being cooled. The increased exposure of the air due to the double set of evaporator pads through which the air is passed results in an increased level of evaporation, and a higher level of cooling efficiency is accordingly obtained so that effective cooling is obtained under the more severe climatic conditions. Under less severe conditions, adequate cooling is obtained at reduced air flow so that a lower blower speed may be employed to reduce cooling costs when such conditions prevail.

A simple and inexpensive means is thus provided for the enhancement of an evaporative cooling system in accordance with the stated objects of the invention, and although but a single embodiment of the invention has been illustrated and described, it will be apparent to those skilled in the art that various changes and modifications may be made therein, as for example, the adaptation of the invention for use with a side-draft cooler, without departing from the spirit of the invention or from the scope of the appended claims.

What is claimed is:

1. A precooler for air flowing through ambient air inlets of an associated evaporative cooler comprising:
    a jacket adapted to at least partially envelope the exterior of the associated evaporative cooler in upstream airflow relationship to said air inlets,
    said jacket comprising an upright frame and porous media supported within said frame,
    said media being capable of permitting the gravitation therethrough of cooling water and the transverse flow of ambient air so that the ambient air may be precooled by said media before entering said airflow inlets,
    a manifold adjacent the upper portion of said media and adapted to discharge water into the latter for gravitation therethrough, a first means for connecting said manifold to a source of cooling water in said associted evaporative cooler, and a second means for collecting water which gravitated through said media and for conveying it back to a sump in said associated evaporative cooler.

2. A precooler for air flowing through ambient air inlets of an associated evaporative cooler comprising:

a jacket for enveloping the exterior of the associated evaporative cooler in upstream airflow relationship to said air inlets, said jacket comprising an upright frame and porous media supported within said frame, said media being capable of permitting the gravitation therethrough of cooling water and the transverse flow of ambient air so that the ambient air may be precooled by said media before entering said air inlets, a manifold adjacent the upper portion of said media and adapted to discharge water into the latter for gravitation therethrough, a first conduit means for connecting said manifold to a source of cooling water in said associated evaporative cooler, a second conduit means for collecting water which gravitated through said media and for conveying it back to a sump in said associated evaporative cooler, and baffle means at the bottom of said frame for engaging the bottom of said associated evaporative cooler for substantially sealing the base of said precooler and the associated evaporative cooler in order to restrict the inflow of ambient air to said media before reaching said air inlets.

3. The precooler set forth in claim 2 wherein:

said frame comprises a right angled parallelogram having a cover over its top end, said manifold being positioned substantially at the center and on the inside periphery of said cover, and a third conduit means suspended from the inside periphery of said cover for conducting cooling water from said manifold to the upper portions of said media.

4. The precooler set forth in claim 3 wherein:

said third conduit means comprises a spider like configuration.

5. The precooler set forth in claim 2 wherein:

said baffle means are adjustably mounted for moving transversely toward and away from the base of said associated evaporative cooler.

6. The precooler set forth in claim 5 in further combination with:

insulation means mounted on the inside periphery of said cover for insulating the associated evaporative cooler from the effects of the sun.

7. The precooler set forth in claim 6 wherein:

said insulation means at least partially envelopes said manifold and said third conduit means.

8. An evaporative cooler apparatus comprising:

an evaporative cooler, said cooler comprising a frame, a sump secured to a lower portion of said frame, a plurality of evaporative cooler pad assemblies formed of a porous media held by said frame above said sump, each pad assembly having an ambient air inlet side and an outlet side, means for forcing air through said assemblies in a direction from said air inlet side toward said outlet side, each of said pad assemblies having an upper portion, a water trough in each upper portion, each water trough having a plurality of water distributor openings disposed and adapted to deliver water to an upper portion of a respective pad assembly therebelow, each of said pad assemblies having a lower portion provided with a water outlet opening for draining into said sump, means disposed for delivering water from said sump into each trough at the upper portion of said pad assemblies, and a precooler for enveloping the exterior of said evaporative cooler in upstream airflow relationship to said air inlets, said precooler comprising an upright frame and porous media supported within said frame, said media being capable of permitting the gravitation therethrough of cooling water and the transverse flow of ambient air so that the ambient air may be precooled by said media before entering said air inlets, a manifold adjacent the upper portion of said media and adapted to discharge water into the latter for gravitation therethrough, conduit means for connecting said manifold to said means for delivery of water from said sump in said evaporative cooler, a second conduit means for collecting water which gravitated through said media and for conveying it back to said sump in said evaporative cooler, and baffle means at the bottom of said frame for engaging the bottom of said evaporative cooler for substantially sealing the base of said precooler and the evaporative cooler in order to restrict the inflow of ambient air to said media before reaching said air inlets.

* * * * *